United States Patent [19]

Rodgers

[11] 3,929,158

[45] Dec. 30, 1975

[54] REMOTE PRESSURE-VACUUM RELIEF VALVE ASSEMBLY

[75] Inventor: Robert E. Rodgers, Connersville, Ind.

[73] Assignee: Stant Manufacturing Company, Inc., Connersville, Ind.

[22] Filed: July 3, 1974

[21] Appl. No.: 485,350

[52] U.S. Cl. ............................... 137/493.9; 137/493
[51] Int. Cl.² ................... G05D 27/00; F16K 17/04
[58] Field of Search ............. 137/493.9, 493.2, 493, 137/525, 525.1, 587, 508; 270/44 R, 86 R

[56] References Cited
UNITED STATES PATENTS

| 2,986,159 | 5/1961 | Snyder | 137/493 |
| 3,032,060 | 5/1962 | Huffman | 137/516.15 |
| 3,073,339 | 1/1963 | Stelzer | 137/516.15 |
| 3,403,696 | 10/1968 | Pynchon | 137/516.13 |
| 3,439,873 | 4/1969 | Relf | 137/493.9 X |

FOREIGN PATENTS OR APPLICATIONS

| 711,198 | 6/1954 | United Kingdom | 137/493.9 |

*Primary Examiner*—Irwin C. Cohen
*Assistant Examiner*—Robert J. Miller
*Attorney, Agent, or Firm*—William R. Coffey

[57] ABSTRACT

A safety pressure-vacuum relief assembly for vehicle fuel tanks and the like which is adapted to be mounted at an external point on the vehicle and to be connected to the interior of the tank at a point remote from the conventional tank filler neck. The assembly consists essentially of a tubular fitting having a flared upper end terminating in a substantially flat peripheral flange and having a reduced lower end, a plate resting on the flange and formed with a plurality of openings therethrough, all located at least a first distance from the center of the plate and with at least one aperture therethrough located at a lesser distance from the plate center, an annular, flexible gasket having an outer peripheral bead and an inner peripheral bead on the upper surface of the plate, an inverted cup having a peripheral skirt encompassing the plate, the flange and the gasket and having a reduced, upwardly-extending base defining, with the skirt, a downwardly-facing shoulder, the skirt being deformed to prevent axial separation of the cup and flange whereby the outer gasket bead is sealingly gripped between the shoulder and the plate. The inner bead of the gasket is disposed in a region between the first distance and the lesser distance and a centrally perforated seal plate guided in the cup base urges the gasket inner bead into yieldable sealing engagement with the first-named plate under the influence of a spring confined between the seal plate and the floor of the cup base. That floor is ported and a shield is externally secured to the floor, is axially spaced from the floor ported region and has a down-turned skirt peripherally spaced from the base, A rubberoid umbrella valve has a stem penetrating and fixed relative to a central perforation in the first-mentioned plate to dispose its flexible peripheral region in yieldable sealing engagement with the lower surface of the plate in the region between the first distance and the lesser distance.

7 Claims, 1 Drawing Figure

U.S. Patent  Dec. 30, 1975  3,929,158
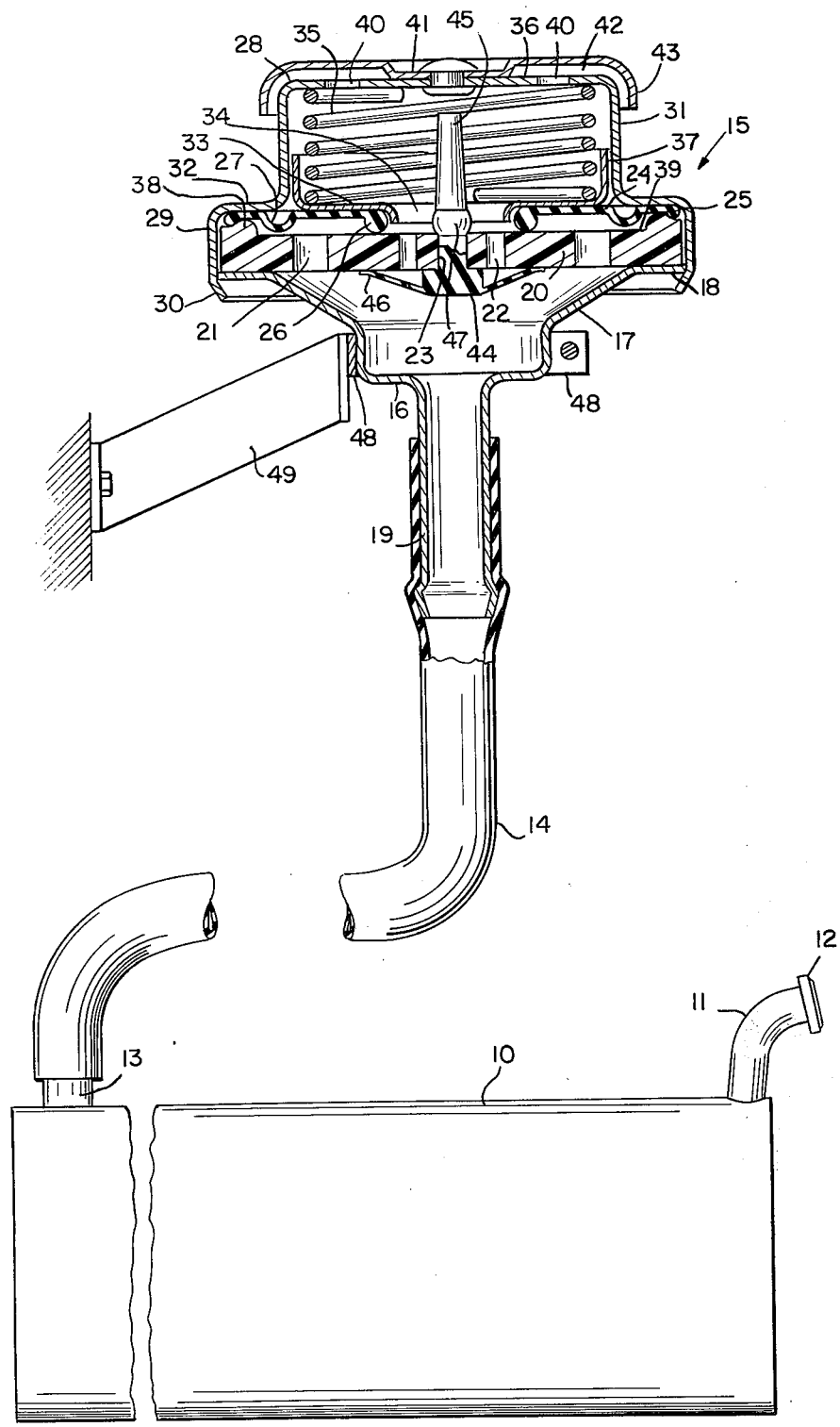

REMOTE PRESSURE-VACUUM RELIEF VALVE ASSEMBLY

The present invention relates to a remote pressure-vacuum relief system primarily intended for use in connection with vehicle fuel tanks and the like. The principal objective of the invention is to provide an assembly which may be located outside the vehicle at a point remote from the tank, which communicates with the interior of the tank at a point remote from the conventional filler neck of the tank and which will automatically relieve superatmospheric pressure within the tank when it rises above a predetermined value and automatically relieve subatmospheric pressure within the tank when it falls below a predetermined value.

It has become conventional to build into the closure caps for fuel tank filler necks a valving system which will provide similar relief; but there are disadvantages in such an arrangement. First of all, such closure caps are necessarily subject to frequent handling since such a cap must be bodily removed from the filler neck when fuel is to be added to the tank. Some filling station attendants are notoriously careless, frequently dropping the caps, sometimes failing to replace them securely and sometimes wholly forgetting to replace them at all. Such careless handling often damages the valving mechanism in such a way that the damage is not readily perceptible; but such damage may significantly affect the supplying of fuel to the engine, as may an insecure replacement of a valved cap onto the filler neck. Loss of a valved cap, which almost invariably results when the attendant fails to replace it, requires, of course, the purchase of a new one; and a properly constructed valved filler neck cap is relatively expensive.

Furthermore, in present-day automobiles, the distal end of a fuel tank filler neck is frequently located in an enclosed space into which the escape of fuel fumes, when internal tank pressures rise above the predetermined value, may be dangerous.

The present invention contemplates the location of a pressure-vacuum relief system at a point suitably remote from the tank and from the filler neck of the tank so that, if desired, the filler neck closure may be a simple, unvalved cap.

Further objects of the invention will appear as the description proceeds.

To the accomplishment of the above and related objects, this invention may be embodied in the form illustrated in the accompanying drawing, attention being called to the fact, however, that the drawing is illustrative only, and that change may be made in the specific construction illustrated and described, so long as the scope of the appended claims is not violated.

The single FIGURE is a more or less diagrammatic illustration of a valving system constructed in accordance with the present invention and associated with a conventional vehicle fuel tank.

As shown, the tank 10 is provided near one end with an upstanding filler neck 11 which is normally closed by a suitable cap 12. Near the other end of the tank, a fitting 13 enters the tank and a suitable conduit 14 is connected to the fitting 13 and leads to the safety pressure-vacuum relief assembly indicated generally by the reference numeral 15.

The assembly 15 comprises a tubular fitting 16 having a flared upper end 17 which terminates in a substantially flat peripheral flange 13 which is disposed in a plane substantially perpendicular to the axis of the fitting 15. The fitting 16 has a reduced lower end 19 suitably shaped for reception of the conduit 14.

A substantially flat plate 20, preferably but not necessarily formed from plastic material, is peripherally congruent with the flange 18 upon which it rests. Said plate 20 is formed with a first plurality of openings 21 all of which are radially spaced from the center of the plate by at least a first dimension and which may preferably be arranged in a common circle uniformly spaced from said center. At a lesser distance from the plate center, the plate is formed with one or more apertures 22 therethrough, and the plate is centrally perforated as at 23.

Resting upon the upper surface of the plate 20 is a flexible, annular gasket 24 having an outer peripheral bead 25 and an inner peripheral bead 26 with a weakened region 27 therebetween.

An inverted cup 28 is formed with a peripheral skirt 29 which encompasses the gasket, the plate 20 and the flange 18; and the skirt 29 is deformed as at 30 to hold the cup 28 and the flange 18 against axial separation. The cup 28 is formed to provide a reduced, upstanding base 31 which, with the skirt 29, defines a downwardly-facing shoulder 32.

As will be readily perceived, the parts thus far described are so proportioned and designed that the bead 25 of the gasket 24 is gripped between the shoulder 32 and the outer region of the plate 20, the weakened gasket portion 27 is free and the gasket bead 26 is disposed between the openings 21 and the apertures 22. A seal plate 33 formed with a central aperture 34 provides an upturned flange 37 which is guidingly received within the base 31 of the cup 28, bears upon the internal region of the gasket 24 and is resiliently urged toward the plate 20 by a spring 35 confined between the seal plate and the floor 36 of the cup 31. Thus, the gasket bead 26 is yieldably held normally in sealing engagement with the upper surface 39 of the plate 20.

Preferably, an upstanding bead 38 is formed near the outer periphery of the upper surface 39 of the plate 20 so that the gasket bead 25 is located radially outwardly with respect to said bead 38 to guard affirmatively against slippage of the outer periphery of the gasket.

The floor 36 of the cup 31 is ported as at 40 and a shield 41 is suitably centrally secured externally to the cup floor 36, said shield being so shaped that it is spaced axially as at 42 from the cup floor in the ported region of said cup floor. The shield is preferably further formed with a downturned peripheral skirt 43 which is similarly spaced from the peripheral wall of the cup base 31.

A rubberoid umbrella valve 44 is formed to provide a stem 45 and a flexible peripheral region 46. The stem 45 is projectable through the central aperture 23 of the plate 20 and preferably is formed with a compressible protuberance 47 which, when it has passed through the aperture 23, retains the stem 45 against axial movement relative to the plate 20.

Any suitable means is provided for securing the assembly at any selected point to a vehicle chassis or body such as, for instance, the clamp 48 carried upon a bracket 49.

Normally, of course, the parts of the above-described assembly will occupy the positions illustrated in the drawing in which fluid cannot pass the plate 20 in either direction. If the internal pressure within the tank 10 rises above the value which is predetermined by the characteristics of the selected spring 35, that pressure acting upon the under surface of the gasket 24 will lift the bead 26 and the seal plate 33 against the tendency of the spring to permit fluid to flow from the conduit 14 through the openings 21, past the bead 26, through the aperture 34 and through the ports 40 to atmosphere. When the pressure within the tank has thus been relieved to the above-mentioned predetermined value, the spring 35 will again seat the bead 26 on the upper surface of the plate 20 to stop such flow.

When the pressure within the tank 10 falls below a predetermined subatmospheric value, as determined by the characteristics of the flexible portion 46 of the valve 44, the pressure differential, acting through the apertures 22, will lift the periphery of the umbrella valve 44 off the lower surface of the plate 20 to permit air to flow through the assembly and the conduit 14 to the interior of the tank 10. When the vacuum within the tank has been sufficiently relieved, the inherent resiliency of the flexible portion 46 of the valve 44 will cause the valve periphery to return to sealing engagement with the under surface of the plate 20.

I claim as my invention:

1. A safety pressure-vacuum relief assembly for vehicle fuel tanks and the like comprising a tubular fitting having an upwardly flared upper end and a reduced lower end, a substantially flat flange circumscribing said upper end and disposed in a plane substantially perpendicular to the axis of said fitting, a substantially flat plastic plate resting on and peripherally substantially congruent with said flange, a plurality of openings through said plate, each of said openings being disposed at at least a first radial distance from the center of said plate, at least one aperture through said plate at a radial distance from said plate center less than said first distance, an inverted cup having a peripheral skirt and a reduced, upwardly-extending base defining an annular shoulder, said skirt encompassing said flange and being deformed to hold said fitting and said cup against axial separation, an annular, flexible gasket having an outer peripheral bead gripped between said plate and said shoulder and an inner peripheral bead engaging the upper flat surface of said plate in an annular area disposed between said first distance and said lesser distance, a seal plate having a central aperture and bearing on a radially inward region of the upper surface of said gasket, spring means confined between the floor of said cup base and said seal plate to urge said gasket inner peripheral bead into yieldable sealing contact with the upper surface of said plate to provide a pressure relief valve for the tank, a rubberoid umbrella valve having a stem centrally penetrating and axially fixed relative to said plate and having its flexible outer peripheral region normally in sealing engagement with the lower surface of said plate in an annular region disposed between said first distance and said lesser distance to provide a vacuum relief valve for the tank, means for mounting said assembly on a vehicle, and conduit means for connecting said lower end of said fitting with the interior of a fuel tank for such a vehicle at a point remote from the filler neck of such a tank, said cup base having ports therein to provide communication between the cup interior and the atmosphere.

2. The assembly of claim 1 in which the floor of said cup base is ported, and a shield externally secured to said cup base, axially spaced from the ported region of said cup base and at its periphery radially spaced from said base and turned toward said shoulder.

3. The assembly of claim 1 in which said seal plate has a peripheral up-turned flange guided in said cup base for reciprocation toward and away from said plate.

4. The assembly of claim 1 in which said openings are arranged in a circular series at a common radial distance from said plate center.

5. The assembly of claim 1 in which said plate is a plastic disc with a peripheral bead on its upper surface and said gasket outer bead disposed radially outwardly of said plate bead.

6. A safety pressure-vacuum relief assembly for vehicle fuel tanks and the like comprising a tubular fitting having an upper end and a lower end and having an upwardly facing substantially flat flange circumscribing its upper end and disposed in a plane substantially perpendicular to the axis of said fitting, a generally circular plastic plate resting on and substantially concentric with said flange, said plate having a plurality of openings axially therethrough, each of said openings being disposed at at least a first radial distance from the center of said plate, said plate also having at least one aperture extending axially therethrough at a radial distance from said plate center less than said first distance, an inverted cup having a peripheral skirt and a reduced, upwardly-extending base defining an annular shoulder, said skirt encompassing said flange and providing means holding said fitting and said cup against axial separation, an annular, flexible gasket having an outer peripheral portion gripped between said plate and said shoulder and an inner peripheral bead engaging the upper surface of said plate in an annular area disposed between said first distance and said lesser distance, a seal plate bearing on a radially inward region of the upper surface of said gasket, spring means confined between the floor of said cup base and said seal plate to urge said gasket inner peripheral bead into yieldable sealing contact with the upper surface of said plate to provide a pressure relief valve for the tank, a vacuum valve member normally in sealing engagement with the lower surface of said plate in an annular region disposed between said first distance and said lesser distance, means for mounting said assembly on a vehicle, and conduit means for connecting said lower end of said fitting with the interior of a fuel tank for such a vehicle at a point remote from the filler neck of such a tank, said cup being ported to provide communication between the cup interior and the atmosphere.

7. The assembly of claim 1 in which said plate is a plastic disc with a peripheral bead on its upper surface and said gasket outer portion is a peripherally extending bead disposed radially outwardly of said plate bead to be captured and held securely to said shoulder to provide a peripheral seal between said plate and said cup.

* * * * *